June 5, 1923.
L. G. HACKWORTH
1,457,888
DEMOUNTABLE RIM FOR VEHICLE WHEELS
Filed Dec. 31, 1921
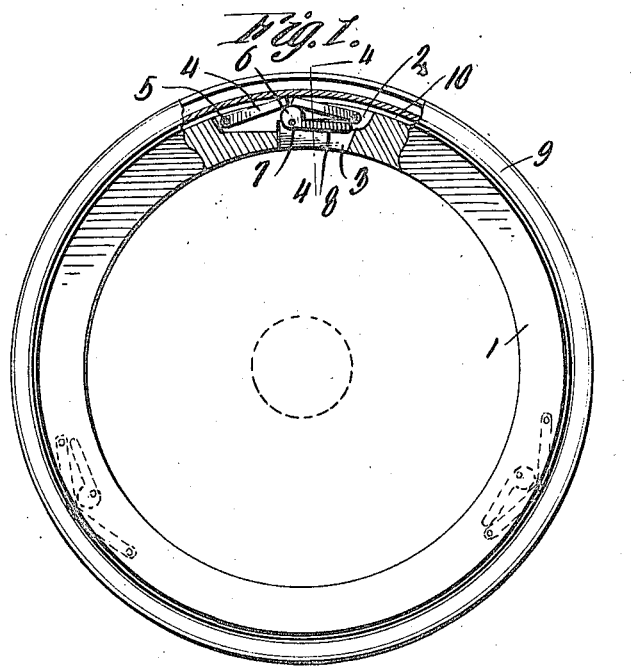
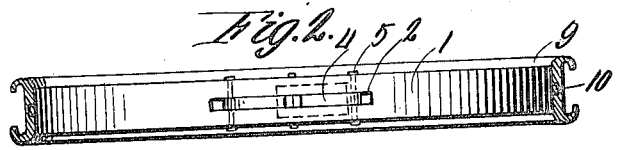
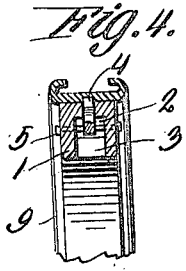
Inventor
LINDALL G. HACKWORTH
WITNESSES
By *Richard B. Owen*, Attorney Patented June 5, 1923.

1,457,888

UNITED STATES PATENT OFFICE.

LINDALL G. HACKWORTH, OF RUBLE, MISSOURI.

DEMOUNTABLE RIM FOR VEHICLE WHEELS.

Application filed December 31, 1921. Serial No. 526,173.

*To all whom it may concern:*

Be it known that I, LINDALL G. HACKWORTH, a citizen of the United States, residing at Ruble, in the county of Reynolds and State of Missouri, have invented certain new and useful Improvements in Demountable Rims for Vehicle Wheels, of which the following is a specification.

The present invention relates to demountable rims for vehicle wheels and especially those which are commonly in use at the present time upon automobiles.

The object of the invention is to provide means for locking the demountable rim to the wheel so that it will be efficiently held in engagement therewith and when so desired may be disengaged therefrom so as to be readily removed.

In the drawing:—

Figure 1 is a side elevation of the wheel embodying my invention, a portion thereof being shown in section, Figure 2 is a plan view of the wheel felly showing the demountable rim in section, Figure 3 is a section through the demountable rim, and Figure 4 is a section taken on the line 4—4 of Figure 1.

Referring to the drawing in detail it will be seen that the felly 1 of the wheel is provided with a plurality of peripheral recesses 2 having a mouth or entrance 3 from the interior periphery so that the parts mounted within the recess may be operated as will be evident as the description progresses. A pair of arms 4 are suitably pivoted at 5 at each end of the recess 2 so that their free ends lie adjacent to each other. A cam element 6 is rotatably mounted as at 7 so as to engage the free ends of the levers 4 and move the levers so that they will be in and out of alignment with each other. An operating arm 8 is fixed to or formed integral with the cam element 6 for rotating the same. The demountable rim 9 may be of any preferred construction except that it is provided with an annular groove 10 upon its inner periphery as is shown to advantage in Figure 3.

As is indicated in Figure 1 there are preferably provided three of the recesses 2 each of which contain the elements previously described. By pulling downwardly upon the operating arm 8 it will be seen that the cam 6 will be rotated so as to allow the arms 4 to be positioned in alignment with each other or so that the free ends thereof will be out of engagement with the groove 10 of the demountable rim 9 at which time it may be readily removed from the felly 1. The cam 6 and its operating arm 8 when in the position shown in Figure 1 are prevented from accidental movement because of a slight pressure from the demountable rim 9 which is preferably formed of metal and the cam 6 will be sufficiently large so as to cause a slight binding action between the free ends of the arms 4 and the inner periphery of the groove 10.

The disclosed embodiment of my invention relates to the preferred form thereof and it should be understood that many changes in form, proportions, and combination of parts may be resorted to without departing from the spirit of the invention.

Having thus described my invention what I claim as new is:—

1. In combination, a wheel felly provided with a plurality of recesses in its outer periphery, a demountable rim provided with a groove on its inner periphery, a pair of arms pivoted in each recess and means for forcing the free ends of the arms into the groove of the demountable rim thereby locking the same in engagement with the felly.

2. In combination, a wheel felly provided with a plurality of recesses in its outer periphery, arms pivotally mounted in each recess, cams for engaging the free ends of the arms, means for operating the cams, a demountable rim having a groove in its internal periphery for receiving the free end of the arms in the manner and for the purpose specified.

In testimony whereof I affix my signature in presence of two witnesses.

LINDALL G. HACKWORTH.

Witnesses:
C. M. BUFORD,
R. C. JORDAN.